United States Patent Office 2,862,873
Patented Dec. 2, 1958

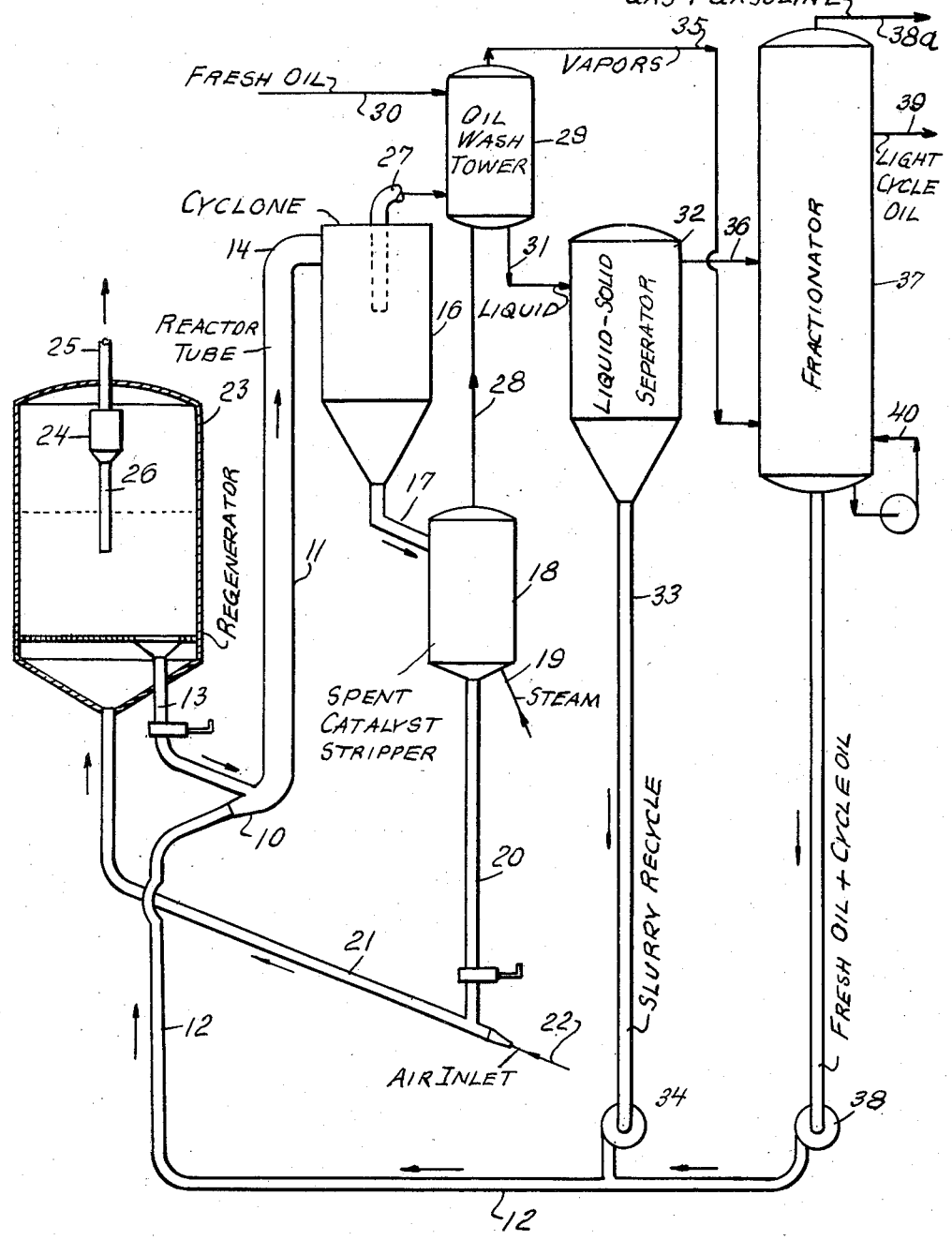

2,862,873

CATALYST RECOVERY PROCESS

Ralph E. Hall, Hammond, Ind., assignor to Sinclair Refining Company, New York, N. Y., a corporation of Maine Application August 27, 1953, Serial No. 376,874

2 Claims. (Cl. 208—83)

My invention relates to improvements in processing procedure in the conversion of petroleum hydrocarbons at elevated temperature in the presence of a finely divided solid catalyst.

Conventional methods for contacting hydrocarbon charge stocks with finely divided solid catalysts in conversion processes have subordinated consideration of optimum contact procedure from the standpoint of chemical kinetics to procedure providing optimum practicality in terms of process continuity, flexibility and simplicity. Thus the fluidized bed reaction system in catalytic cracking has been adopted commercially on a large scale because the charge stock can be readily contacted with catalyst and as the catalyst is maintained in the form of a dense phase fluidized bed, i. e. about 25–40 pounds per cubic foot, a large enough mass of catalyst can be provided in a reactor of feasible size for high conversion of charge stock at a relatively high rate of throughput. Catalyst can be readily circulated from and recirculated to the bed for purposes of regeneration and conditions of reaction severity can be readily controlled by variation in the size of the bed to accommodate variation in feed stock or desired extent of conversion. The mixed state of the fluidized bed, however, results in a homogeneous reaction phase which produces a distribution of products, i. e. yield of gasoline and production of undesired coke and gas, for any given conversion level that is below the optimum. Significant improvement in product distribution can be achieved by conducting the conversion reaction under conditions of progressive flow and reaction, that is in a kinetic environment in which all molecules of the reacting constituents are treated equally to increasing reaction time and catalyst contact by flowing powdered catalyst with oil vapors concurrently through an elongated reaction zone at high enough velocity to prevent forward-backward mixing. Such conditions of progressive flow and reaction without bumping and excessive vibration require velocities of flow of at least about 12 to 15 feet per second with maximum densities of only 5 to 10 pounds per cubic foot.

One of the problems associated with commercial application of conditions of progressive flow and reaction to catalytic cracking is the difficulty of separation of catalyst from the reaction products. This problem is made more pronounced in a system operating under conditions of progressive flow and reaction than it appears in fluid catalytic cracking because of the relatively higher velocity of and the relatively higher catalyst-to-oil ratio in the effluent from the reaction zone. I have now devised a method of catalyst-hydrocarbon vapor separation, which is especially adaptable to catalytic cracking systems operating under conditions of progressive flow and reaction, combining a preliminary vapor-solids separation with a liquid wash and a liquid-solids separation. My novel process requires a minimum of equipment and effects important heat economies.

According to my invention a suspension of finely divided catalyst is formed in vapors of a petroleum hydrocarbon charge stock to be converted resulting in a density of about 5 to about 10 pounds per cubic foot. The suspension is flowed initially at a linear velocity exceeding about 12 to 15 feet per second upward through an elongated, vertically extending confined reaction path. The effluent from the confined reaction path is passed to a vapor-solids separator for the removal of a substantial portion of the finely divided catalyst and the separated vapors containing the remaining portion of the finely divided catalyst are washed in a washing zone with a liquid petroleum fraction to remove the catalyst from the vapors. The liquid petroleum fraction is then passed to a liquid-solids separator for separation of the catalyst from the liquid petroleum fraction and the separated liquid petroleum fraction is introduced as a portion of the charge stock into the confined reaction path. The catalyst from the vapor-solids separator is regenerated with air and reintroduced into the confined reaction path and the catalyst from the liquid-solids separator is reintroduced into the confined reaction path as a slurry. Advantageously the liquid petroleum fraction introduced into the washing zone comprises the petroleum hydrocarbon charge stock. Also advantageously the vapors from the washing zone and the clarified liquid petroleum fraction from the liquid-solids separator are passed to a common fractionator from which the bottoms containing fresh feed and cycle oil are introduced into the confined reaction path as the petroleum hydrocarbon charge stock.

The process of my invention thus realizes several important advantages. In addition to employing simple equipment to effect catalyst-oil separation, the process effects the exchange of heat between the hydrocarbon conversion reaction vapors and the fresh hydrocarbon feed without the use of conventional tubular heat exchange equipment while effecting the catalyst-oil separation. A further advantage is realized by operation according to the preferred embodiment of the process of my invention in which the vapors from the washing zone and the clarified liquid petroleum fraction from the liquid-solids separator are passed to a common fractionator. Such a process results in a clean fractionator with essentially no catalyst entering it and eliminates the need for recycling bottoms as a tower wash or as a heat removal system, together with the resulting required equipment.

My invention will be further described by reference to the flow diagram of the accompanying drawing. Preheated hydrocarbon vapors are charged to the inlet section 10 of reactor tube 11 by means of line 12. Freshly regenerated catalyst from catalyst standpipe 13 is suspended in the vapors in inlet section 10 and the resulting suspension is flowed according to the particular equipment at charge rates providing a density of about 5 to 10 pounds per cubic foot and a flow velocity of at least about 12 to 15 feet per second upwardly through reactor tube 11. The effluent from reactor tube 11 is discharged tangentially through pipe bend 14 into catalyst-oil separator 16. Catalyst-oil separator 16 may be a cyclone separator designed to make a rough separation between catalyst and oil vapors. Because of the large quantity of catalyst to be handled, the cyclone separator must necessarily operate at low velocities in order to prevent serious erosion difficulties and the outlet vapors will consequently be rather high in catalyst loading. The catalyst disengaged in separator 16 settles in the lower section and passes by gravity through line 17 into catalyst stripper 18 where it may be contacted with steam introduced through line 19 to strip adsorbed hydrocarbons from the catalyst surface. From stripper 18 catalyst flows into standpipe 20 and from thence into regenerator riser 21. Catalyst entering regenerator riser 21 is picked up by regeneration air introduced by connection 22 and the resulting mixture flows into regenerator 23 where the bulk of the carbon is burned off to regenerate the catalyst for reuse. Flue gas from the regeneration leaves regenerator 23 through a system of internal cyclones 24 and line 25. Dipleg 26 is provided for return of catalyst disengaged in the cyclones to the catalyst bed.

Vapors leave separator 16 and stripper 18 overhead and are passed by means of lines 27 and 28 respectively to the lower portion of oil wash tower 29 where they are contacted with fresh oil introduced through line 30. The fresh oil introduced through line 30 serves to wash the catalyst from and partially to condense the vapors introduced through lines 27 and 28. The oil containing the catalyst is discharged from oil wash tower 29 through line 31 and enters liquid-solids separator 32. Catalyst separated from the oil in separator 32 is discharged as a slurry in oil by means of line 33 and returned to reactor tube 11 by means of pump 34 and line 12.

Vapors leaving oil wash tower 29 through line 35 and oil leaving separator 32 by line 36 are separately passed to fractionator 37. Gas and gasoline are withdrawn from fractionator 37 by means of line 38a. Fresh oil plus cycle oil is withdrawn as bottoms from fractionator 37 and passed to reactor tube 11 as the hydrocarbon feed stock by means of pump 38 and line 12. Depending upon the charge stock to the process, light cycle oil may be withdrawn from fractionator 37 by means of line 39 and a circulating heat transfer stream 40 may be provided in fractionator 37.

The reaction conditions are adjusted according to the charge stock and the conversion level desired. The process system is designed primarily for cracking heavy feeds which boil considerably above the light cycle oil range so that no virgin oil is withdrawn as light cycle oil without being cracked. Typically the feed would have an initial boiling point of 750° F. and the light cycle oil an end point of 650° F. If, however, increased heating oil production were desired, a lighter feed stock could be charged to the system. The reaction temperature ordinarily is in the range of about 850° to 1000° F.; catalyst-to-oil ratio is in the range of about 5:1 to 25:1; and the space velocity is in the range of about 5 to 60 weight liquid per weight of catalyst per hour.

A typical unit would process about 22,000 barrels per day of 22° API gas oil. With a catalyst-to-oil ratio of about 6.5 and with a cyclone efficiency of about 85 percent, about 288,000 pounds per hour of catalyst would pass to the oil wash tower. By quenching the effluent from the reactor tube with the fresh feed in the oil wash tower, a heat balance indicates that a temperature of about 700° F. would result for the effluent streams from the oil wash tower. This is a high enough temperature to flash off the light cycle oil and everything lighter in the fractionator. Additional flexibility in temperature control of oil in the oil wash tower may be accomplished by return of cooled fractionator bottoms to the wash tower along with the fresh feed. This also supplies an additional quantity of wash oil.

My invention has its greatest advantage in application to catalytic cracking of heavy petroleum hydrocarbon stocks. Typical stocks are heavy gas oils obtained by primary distillation, vacuum distillation or coking from crude oils of various sources and reduced crudes. The boiling range of these stocks may vary over a wide range, e. g. 600° to 800° F. The invention is applicable to other petroleum hydrocarbon conversions.

I claim:

1. In the conversion of petroleum hydrocarbons in the presence of a finely divided solid catalyst under flow conditions providing progressive reaction, the method which includes forming a suspension having a density of about 5 to about 10 pounds per cubic foot consisting of the finely divided catalyst in vapors of a petroleum hydrocarbon recycle stock, flowing the suspension initially at a linear velocity exceeding about 12 to 15 feet per second upwardly through an elongated, vertically extended confined reaction path, passing the effluent from the confined reaction path to a vapor-solids separation zone wherein a substantial portion of the finely divided catalyst is separated from said effluent leaving a lesser but substantial portion of the catalyst remaining in said effluent, regenerating the catalyst separated from said effluent in said separation zone and returning the regenerated catalyst to the confined reaction path, withdrawing from said vapor-solids separation zone the effluent vapors containing the remaining portion of said catalyst, washing the withdrawn vapors and remaining catalyst by contact with said petroleum hydrocarbon charge stock to be converted, whereby said remaining catalyst is removed from said vapors in said liquid, withdrawing the liquid containing said remaining portion of catalyst from said washing zone and separately withdrawing the washed vapors from said washing zone, separating the liquid withdrawn from said washing zone into a clarified liquid petroleum fraction and an oil slurry containing the remaining portion of said catalyst, passing the withdrawn vapors from said washing zone and the clarified liquid to a common fractionation zone wherein an overhead vapor boiling lower than said charge stock is withdrawn separately from liquids boiling higher than said charge stock, recycling said higher boiling liquids from said fractionation zone together with said oil slurry containing said catalyst as said recycle stock.

2. The method of claim 1 wherein the stock to be converted is a typical heavy gas oil cracking charge stock and the catalyst is a cracking catalyst.

References Cited in the file of this patent

UNITED STATES PATENTS

| | | |
|---|---|---|
| 2,312,230 | Belchetz | Feb. 23, 1943 |
| 2,328,325 | Butikofer | Aug. 31, 1943 |
| 2,370,816 | Schonberg | Mar. 6, 1945 |
| 2,396,109 | Martin | Mar. 5, 1946 |
| 2,449,095 | Wheeler | Sept. 14, 1948 |
| 2,541,635 | Boyer | Feb. 13, 1951 |
| 2,557,748 | Liedholm | June 19, 1951 |
| 2,663,676 | Cardwell et al. | Dec. 22, 1953 |